C. M. CROOK AND J. R. GAMMETER.
AUTOMATIC TIME INDICATING AND SIGNALING INSTRUMENT.
APPLICATION FILED AUG. 26, 1918.
1,383,534.
Patented July 5, 1921.
4 SHEETS—SHEET 1.
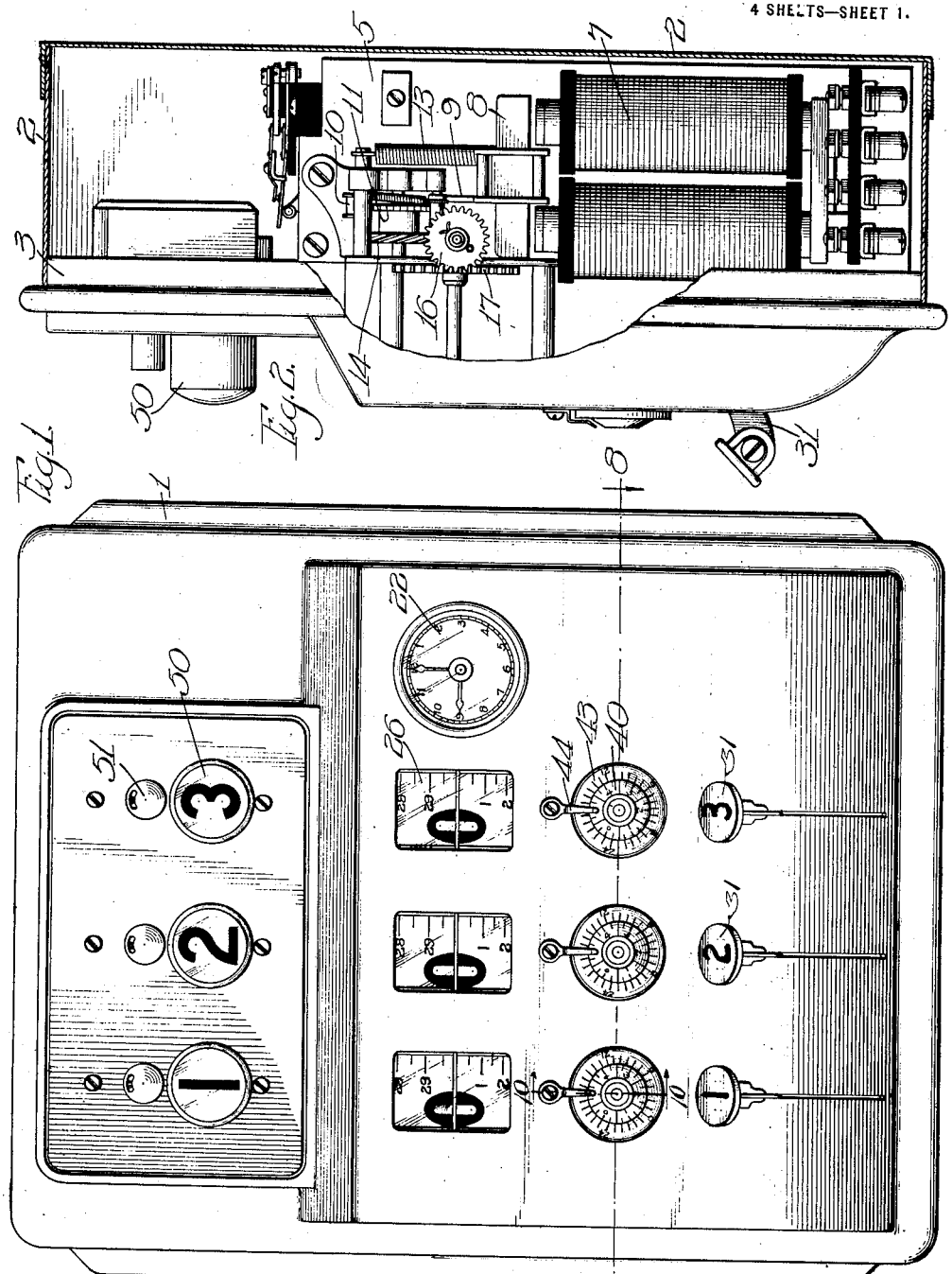

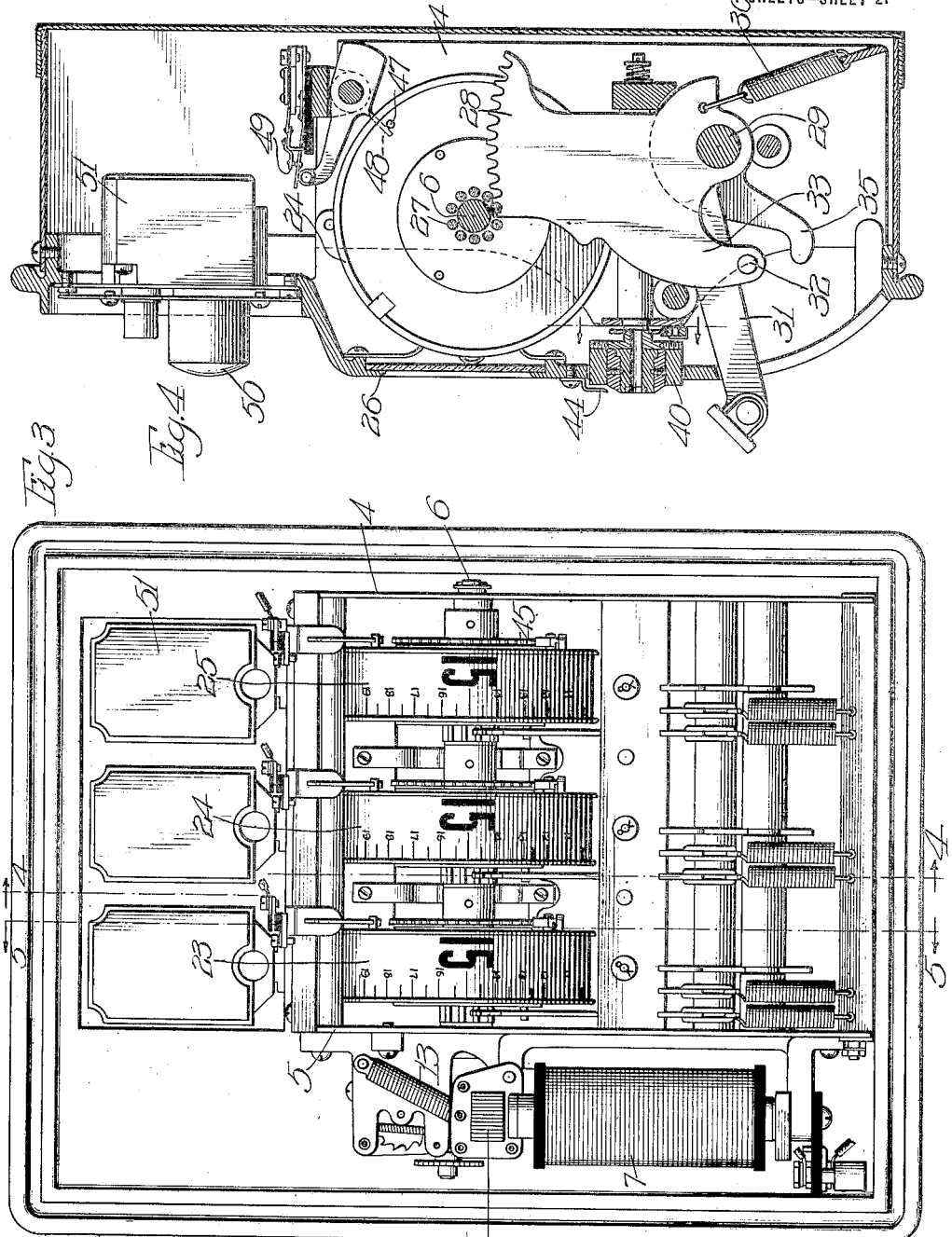

C. M. CROOK AND J. R. GAMMETER.
AUTOMATIC TIME INDICATING AND SIGNALING INSTRUMENT.
APPLICATION FILED AUG. 26, 1918.
1,383,534.
Patented July 5, 1921.
4 SHEETS—SHEET 3.
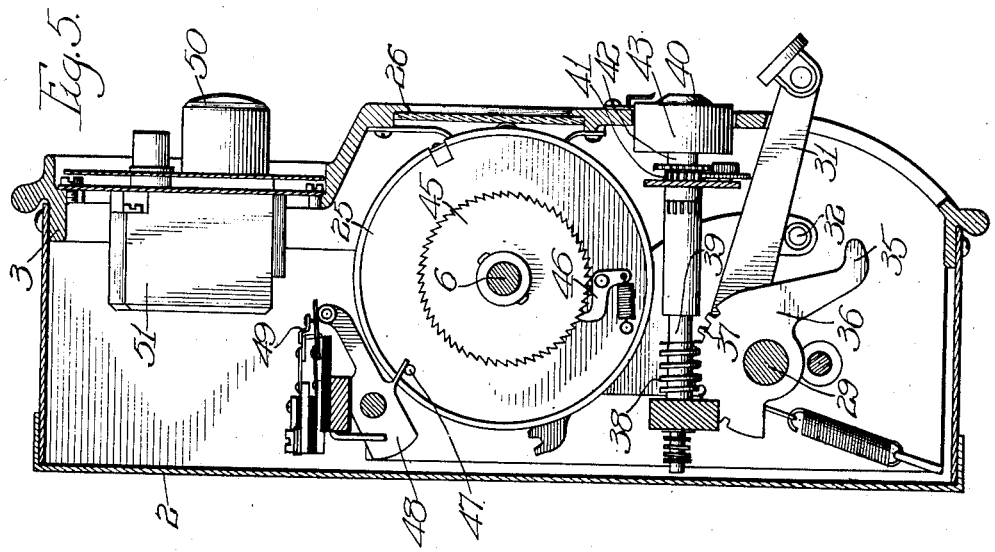
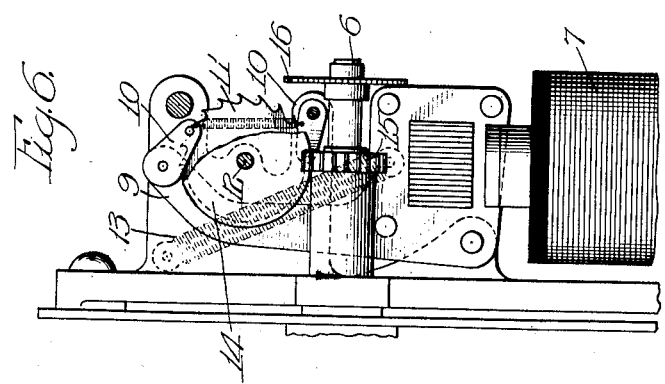
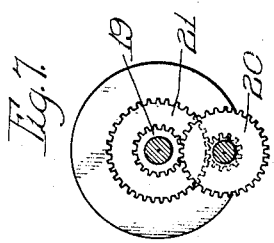
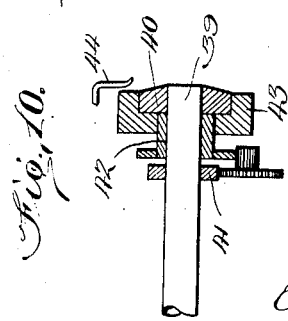
Inventors:
Charles M. Crook,
John R. Gammeter.
by Jones, Addington, Ames & Seibold
Attys.

C. M. CROOK AND J. R. GAMMETER.
AUTOMATIC TIME INDICATING AND SIGNALING INSTRUMENT.
APPLICATION FILED AUG. 26, 1918.

1,383,534.

Patented July 5, 1921.

UNITED STATES PATENT OFFICE.

CHARLES M. CROOK, OF CHICAGO, ILLINOIS, AND JOHN R. GAMMETER, OF AKRON, OHIO, ASSIGNORS TO STROMBERG ELECTRIC COMPANY, OF CHICAGO, ILLINOIS, A CORPORATION OF MAINE.

AUTOMATIC TIME-INDICATING AND SIGNALING INSTRUMENT.

1,383,534. Specification of Letters Patent. Patented July 5, 1921.

Application filed August 26, 1918. Serial No. 251,374.

*To all whom it may concern:*

Be it known that we, CHARLES M. CROOK and JOHN R. GAMMETER, citizens of the United States, residing, respectively, at Chicago, in the county of Cook and State of Illinois, and Akron, in the county of Summit and State of Ohio, have invented certain new and useful Improvements in Automatic Time-Indicating and Signaling Instruments, of which the following is a full, clear, concise, and exact description, reference being had to the accompanying drawings, forming a part of this specification.

Our invention relates to improvements in timing apparatus and particularly to automatic process time-indicating and signaling instruments, it being directed particularly toward improvements in that class of apparatus wherein the apparatus, after the lapse of a predetermined period of time, will perform a predetermined action, such as giving a signal, initiating the action of other mechanism, or the like.

In the particular embodiment of our invention illustrated we have shown a timing device for indicating the time for use in connection with certain processes,—as an example, that of vulcanizing rubber goods. In this class of work it is desirable that the goods during the vulcanizing process remain in the vulcanizing ovens for a predetermined length of time. Where there are a series of ovens operating, the means for keeping track of the starting of the ovens heretofore have been cumbersome and open to the danger of the clerk keeping track of the ovens forgetting just how long the ovens had been in operation. The device which we have shown is adapted to be used in connection with these ovens and may, when the material is placed in the oven, be set for the time that it is intended the material should remain in the oven. As soon as this time elapses, a signal is given, so that the material may be taken out. A further provision is made whereby the operator at any time may see how much time remains before the process is completed.

For the purpose of disclosing our invention we have illustrated one embodiment thereof in the accompanying drawings, in which—

Figure 1 is a front elevation of a timing apparatus for a bank of three ovens;

Fig. 2 is a side elevation, part of the framework being broken away to show the apparatus in detail;

Fig. 3 is a rear elevation;

Fig. 4 is a sectional view taken on the line 4—4 of Fig. 3;

Fig. 5 is a sectional view taken on the line 5—5 of Fig. 3;

Fig. 6 is a detail view showing the electromagnetic driving mechanism;

Fig. 7 is a detail of the clock train of the mechanism;

Fig. 10 is a fragmentary sectional view on the line 10—10 of Fig. 1.

Figure 8:
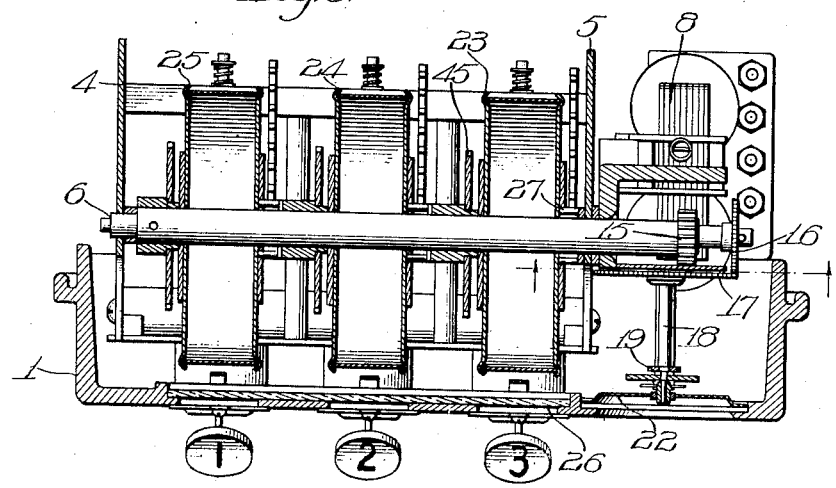
Fig. 8 is a sectional view taken on the line 8—8 of Fig. 1.

In the apparatus disclosed we provide a suitable support and inclosing frame which comprises the front 1 and the rear or inclosing frame 2, which is adapted to inclose the operating parts of the mechanism and be fastened to a flange 3 formed on the rear face of the front.

The operating mechanism is all mounted on the rear face of this front and is supported by a frame comprising the two side members 4 and 5. Mounted between these two side members is a continuously rotating shaft 6. We have used the expression "continuously rotating" although the shaft, as a matter of fact, is rotated step by step. However, the step-by-step movement is continuous. This shaft is driven by the electromagnet 7, the circuit of which is closed once every minute by a suitable master clock. The armature 8 of this magnet is provided with a rocking lever 9 having a pair of dogs 10 which engage a ratchet wheel 11, so that each impulse of the magnet will cause the dogs to rotate the shaft 12 of the ratchet wheel 11 one step, the armature being returned after each impulse to its normal position by a spring 13. Mounted on the shaft 12 is a worm gear 14 which meshes with a pinion 15 on the shaft 6. The shaft 6 is also provided with a gear 16 meshing with a gear 17 mounted on the minute shaft 18 of a clock, this minute shaft 18 being provided with a suitable pinion 19 driving the gear 20, which through the train 21 drives the hour hand of the clock. The clock dial 22 is visible through a suitable glass-covered opening in the front 1.

Mounted on the shaft 6 and freely rotatable thereon is a plurality of drums 23, 24 and 25. As the construction and operation of each of these drums is the same, it will only be necessary to describe one of them. The face of each of the drums bears indicia representing minutes, from 1 to 29, the five-minute intervals being accented by larger numerals than the one-minute intervals. These numerals progress in a counter-clockwise direction and are visible through a suitable glass-covered opening 26 in the front of the casing. Each drum is provided with a pinion 27 adapted to mesh with a segmental gear 28 mounted on a suitable shaft 29. A coiled spring 30 tends to retract the rack to normal position. The rack 28 is moved to a projected position, placing the coiled spring 30 under tension by means of a lever 31 also pivoted on the shaft 29 and adapted to engage, when depressed, a pin 32 on an arm 33 of the rack 28. The distance in its projected position the rack may be moved is determined by an adjustable stop 35 in the path of the pin 32 and which is adjusted from the front. This stop is mounted on an arm 36 likewise mounted on a shaft 29 and the arm is provided with a segmental gear 37 adapted to mesh with the worm gear 38 on the shaft 39. This shaft has a dial 40 on its front end, which dial projects through an opening in the front, and the shaft is provided with a squared end adapted to receive the end of a suitable operating key. The dial is divided into fifths of a minute sections and this shaft 39 is connected by the gear train 41 with a hollow shaft 42 loosely mounted on the shaft 39, having a dial 43. This dial is divided into minute sections, and the gear ratio between the dials 40 and 43 is 1 to 5. A suitable pointer 44 on the face of the front provides an indicator by which the dials may be set. By this arrangement the stop 35, by the rotation of the shaft 39, may be set in any position to permit the drums to be moved in a counter-clockwise direction from 1 to 30 points, with fifth points in between. For each drum there is mounted on the shaft 6 a ratchet wheel 45, which rotates with the shaft. Mounted on each drum is a spring-pressed dog 46 adapted to mesh with the ratchet wheel. It must be understood that the tendency of the spring on the rack 28 is to rotate the drum in the direction of travel of the shaft or in a clockwise direction. Therefore, when the spring is placed under compression by the projection of the rack 28 the drum will have a tendency to rotate in the direction of the shaft 6, which tendency will be restrained except so far as it corresponds to the speed of rotation of the shaft 6 by the engagement of the pawl 46 with the ratchet 45. As the shaft 6 rotates, however, step by step, the drum, under the influence of the spring 30, will likewise rotate step by step until it has reached the limit of its movement, after which the ratchet and shaft will continue to move without affecting the drum. Mounted on each drum is a pin 47, which is so disposed on the drum that when the drum reaches zero it engages one arm of a bell crank lever 48, rocking the lever and causing the other arm to close a switch 49, which switch controls the circuit through a signaling lamp 50. Arranged in this lamp circuit may be a suitable hand-operated switch 51 by which the lamp may be turned off after the signal has been given. Of course, it is obvious that instead of closing the circuit through a signal, circuit through any other operating circuit may be closed, if desired.

In operation, assuming that No. 1 oven is filled and it is desired that the material remain in there fifteen minutes, No. 1 dial is rotated until the numeral 15 is beneath the pointer 47. The shaft 39 is rotated until the point 15 on the dial 43 is opposite the pointer 44. No. 1 lever 31 is then depressed, moving the segmental rack 28 and rotating No. 1 drum. As the stop 35 has been set at the 15-minute point, the backward rotation of the drum is stopped at this point. The spring 30 is placed under tension and the tendency of the drum is to rotate forward. This forward movement is prevented by the engagement of the pawl 46 with the ratchet 45. The shaft 6 rotating will allow the drum to rotate back to normal position step by step until the pin engages the bell crank lever, closing the circuit and at the same time preventing any further movement of the drum. It will be noted that at any time during the rotation of the drum the operator may observe just how much time there remains before the circuit is closed. The drum having been moved back only a distance equal to the 15-minute period, the circuit will be closed after an elapsed period of fifteen minutes, and the signal in the corresponding lamp will be given. If desired, an additional audible signal may be provided also, so that the operator is warned that the material has been in the oven for fifteen minutes and should be removed. We have shown a signal-operating device for a bank of three ovens. It is obvious that if desired any number of signals may be used. We have found it convenient, however, to make the signals up in units of three, and when it is desired to use them for banks of more than three ovens, to merely connect them together side by side.

Figure 9:
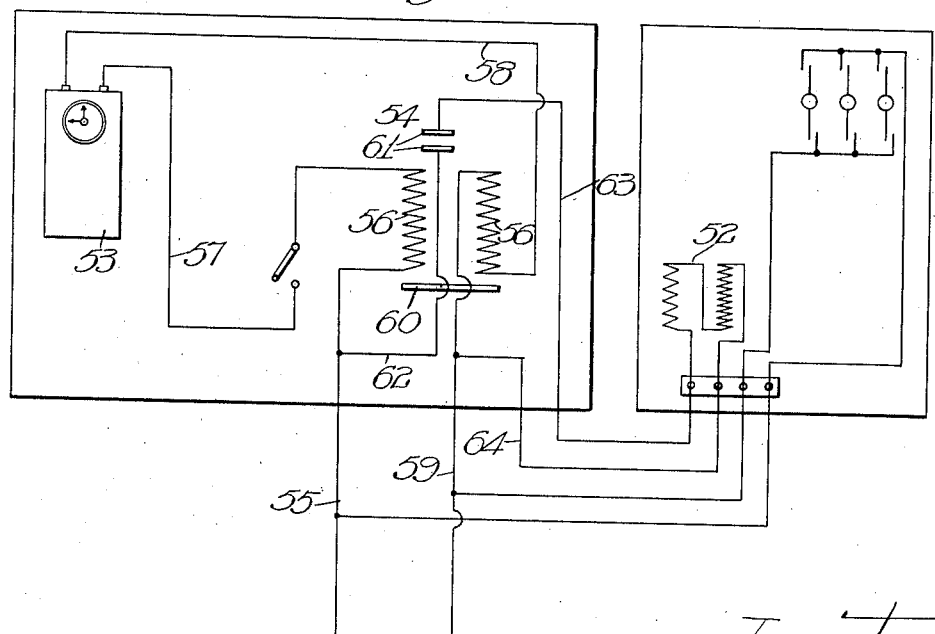
Fig. 9 is a diagrammatic view of the electrical parts.

In Fig. 9 we have illustrated diagrammatically the electrical parts of the apparatus. As shown in this figure, the circuit of the windings 52 of the electromagnet 7 is controlled by a master clock 53 through the medium of a suitable relay 54. This master clock may be set to close the circuit of the electromagnet at predetermined intervals, but we have found that the most satisfactory manner is to set the clock to close the circuit through the windings 52 once every minute. Under these circumstances, when the circuit is closed by the master clock, current may be traced from the positive main 55, through one of the windings 56 of the relay 54, by the way of conductor 57, through the master clock, thence by the way of conductor 58 through the other winding 56 of the relay and back to the negative side 59 of the line. The winding of the relay 54, being thus energized, causes the armature 60 to be attracted, closing the contacts 61 of the relay, thereby closing the circuit from the main 55, by conductors 62, across the contact 61, by conductor 63, through the windings 52 of the magnet 7 and thence by conductor 64 to the opposite side 59 of the line. It is thus seen that the magnet 52 is energized once every minute, thereby rotating the shaft 6 one step every minute.

Having thus described our invention, what we claim as new and desire to secure by Letters Patent, is:—

1. The combination with a continuously rotating shaft, of a circuit-controlling switch, a tripping mechanism for said switch, driving means for said tripping mechanism, means for connecting the tripping mechanism with the shaft to cause the same to operate with the shaft, and means for predetermining the length of time said tripping mechanism shall operate with the shaft.

2. The combination with a continuously operating shaft, of a switch, a trip for operating said switch when it reaches the limit of its movement, means set in operation when the trip is moved in one direction for moving the trip in an opposite direction, means for connecting said trip with the shaft to cause the trip to move under the influence of its driving means with the shaft, and means for predetermining the distance the trip is moved in its initial direction.

3. The combination with a switch, of a trip for operating said switch, a continuously rotating shaft, means for moving said trip away from said switch a predetermined distance, and means for connecting said trip with the shaft so that it will move toward the switch as the shaft rotates.

4. The combination with a switch, of a continuously rotating shaft, a trip for said switch, means for adjustably moving said trip about said shaft, and means for connecting said trip with the shaft to cause it to rotate with the shaft in one direction.

5. The combination with a switch, of a tripping device for operating said switch when said device reaches a predetermined position, means for adjustably retracting the tripping device from said position, a continuously operating time-controlled device, and means for connecting the tripping device with the time-controlled device to cause it to move therewith to its predetermined position and disconnecting it from the time-controlled device when it reaches said position.

6. The combination with a switch, of a continuously rotating shaft, a trip for operating said switch when it reaches a predetermined position rotatably mounted on said shaft, means for adjustably rotating the trip on said shaft away from the tripping position, and means for connecting the trip with the shaft to cause it to rotate therewith toward tripping position and disconnecting it from said shaft when it reaches said position.

7. The combination with a switch, of a continuously rotating shaft, a trip for operating said switch when it reaches a predetermined position, means for retracting said trip from said position, an adjustable stop for determining the distance of retraction, and means for connecting the trip with the shaft to cause it to move therewith toward tripping position and disconnecting it from the shaft when it reaches said position.

8. The combination with a switch, of a continuously rotating shaft, a trip for operating said switch when it reaches a predetermined position, means for retracting said switch from said position, means tending to move the trip toward said position when retracted, and means for connecting the trip with the shaft to prevent it from moving faster than the shaft toward tripping position.

9. The combination with a switch, of a continuously rotating shaft, a trip for operating said switch when it reaches a predetermined position rotatably mounted on said shaft, means for rotating the trip on the shaft away from tripping position, an adjustable stop for determining the distance said trip is moved, means tending to move the trip toward tripping position, a ratchet on said shaft rotating therewith, and a pawl on said trip arranged to engage said ratchet when the trip is moved away from tripping position to prevent the trip from moving toward tripping position faster than said shaft rotates.

10. The combination with a continuously rotating shaft, of a switch, a trip operable with said shaft for a predetermined period of time and operating the switch at the end of its movement, means for setting said trip to operate with the shaft for a predetermined period of time, and means for indicating at any time during the movement of said trip the period remaining before it will reach the end of its movement.

11. The combination with a continuously rotating shaft, of a circuit-controlling switch, means operated by said shaft for operating said switch, means for setting said operating means to operate the switch after the shaft is rotated for a predetermined period of time, and means for indicating at any time the period which must elapse before the switch is operated.

12. The combination with a switch, of a continuously rotating shaft, an indicating drum mounted on said shaft having period indicia thereon progressing in a counter-clockwise direction, a trip mounted on said drum at the zero point thereon, means for rotating said drum on the shaft in a counter-clockwise direction, an adjustable stop for determining the distance said drum is so rotated, means tending to rotate said drum in a clockwise direction, a ratchet on said shaft rotating therewith, and a pawl on said drum arranged to engage said ratchet when the drum is moved in counter-clockwise direction to prevent the drum from moving in a clockwise direction faster than said shaft rotates.

13. The combination with a continuously rotating shaft, of a drum mounted thereon and having period indicia thereon progressing in a counter-clockwise direction, means for rotating said drum in a counter-clockwise direction, and means for connecting said drum with said shaft to cause it to rotate in a clockwise direction at the same rate in which said shaft is rotated.

14. The combination with a continuously rotating shaft, of a drum mounted thereon having period indicia progressing in a counter-clockwise direction around said drum from zero, means for moving said drum in a counter-clockwise direction from zero point, means for connecting said drum with said shaft to cause said drum to rotate in a clockwise direction with said shaft, and means for stopping the drum when said drum reaches its zero point.

15. A time-controlled mechanism, operable means which it is desired should be operated after the lapse of a predetermined period of time, movable means for controlling the instant of operation of said operable means, means whereby the rate of movement of said movable means in one direction is controlled by said time-controlled mechanism, manually operable means for returning said movable means after its time-controlled movement, movable means for positively limiting said return movement to determine the duration of the time-controlled movement, and means for causing said limiting means to travel in a definite path.

16. A time-controlled mechanism comprising a constantly driven shaft, operable means which it is desired shall be operated after the lapse of a predetermined time, movable means for controlling the movement of operation of said operable means, means whereby the rate of movement of said movable means in one direction is controlled by said shaft, means for returning said movable means after its time-controlled movement, movable means for positively limiting said return movement to determine the duration of said time-controlled movement, and means for causing said limiting means to travel in a definite path.

17. A time-controlled mechanism comprising a constantly driven shaft, operable means which it is desired shall be operated after the lapse of a predetermined time, movable means for controlling the movement of operation of said operable means, means whereby the rate of movement of said movable means in one direction is controlled by said shaft, means for returning said movable means after its time-controlled movement, movable means for positively limiting said return movement to determine the duration of said time-controlled movement, and means for adjusting said limiting means.

18. A time-controlled mechanism comprising a constantly driven shaft, operable means which it is desired shall be operated after the lapse of a predetermined time, movable means for controlling the movement of operation of said operable means, means whereby the rate of movement of said movable means in one direction is controlled by said shaft, means for returning said movable means after its time-controlled movement, movable means for positively limiting said return movement to determine the duration of said time-controlled movement, and indicating means for indicating the adjustment of the adjustable means.

19. A time-controlled mechanism, a plurality of operable means, which it is desired be operated after the lapse of periods of predetermined time, a plurality of movable means for controlling the instants of operation of said operable means, means whereby the rate of movement of all of said movable means in one direction is controlled by said time-controlled mechanism, means for returning said movable means after their time-controlled movements, means for positively limiting said return movements for determining the duration of said time-controlled movement, and means for causing said limiting means to travel in a definite path.

20. A time-controlled mechanism, comprising a constantly driven shaft, a plurality of operable means, which it is desired be operated after the lapse of a predetermined time, movable means for controlling the instants of operation of said operable means, comprising a plurality of members, one for each of said operable means, rotatable about the axis of said shaft, means whereby the rate of movement of said movable means in one direction is controlled by the movement of said shaft, means for returning said movable means after their time-controlled movements, means for positively limiting the return movement of said movable means to determine the duration of the time-controlled movements, and means for causing said limiting means to travel in a definite path.

21. A time-controlled mechanism, operable means which it is desired should be operated after the lapse of a predetermined period of time, movable means for controlling the instant of operation of the operable means, means whereby the rate of movement of said movable means in one direction is controlled by said time-controlled mechanism, spring means for effecting the time-controlled movement of said movable means, means for returning said movable means after its time-controlled movement, means for positively limiting said return movement to determine the duration of the time-controlled movement, and means for causing said limiting means to travel in a definite path.

22. A time-controlled mechanism, comprising a rotatable ratchet wheel, operable means which it is desired should be operated after the lapse of a predetermined period of time, movable means for controlling the instant of operation of the operable means, means whereby the rate of movement of said movable means in one direction is controlled by said time-controlled mechanism, comprising a pawl engaging said ratchet wheel, spring means for effecting the time-controlled movement of said movable means, means for returning said movable means after its time-controlled movement, means for positively limiting said return movement to determine the duration of the time-controlled movement, and means for causing said limiting means to travel in a definite path.

23. A time-controlled mechanism, operable means which it is desired should be operated after the lapse of a predetermined period of time, movable means for controlling the instant of operation of said operable means, means whereby the rate of movement of said movable means in one direction is controlled by said time-controlled mechanism, manually operable means for returning said movable means after its time-controlled movement, movable means for positively limiting said return movement to determine the duration of the time-controlled movement, and means for causing said limiting means to travel in a definite path, said manually operable means comprising a lever.

24. A time-controlled mechanism, operable means which it is desired should be operated after the lapse of a predetermined period of time, movable means for controlling the instant of operation of said operable means, means whereby the rate of movement of said movable means in one direction is controlled by said time-controlled mechanism, manually operable means for returning said movable means after its time-controlled movement, movable means for positively limiting said return movement to determine the duration of the time-controlled movement, and means for causing said limiting means to travel in a definite path, said manually operable means comprising a rack and pinion.

In witness whereof, we have hereunto subscribed our names.

CHARLES M. CROOK.
JOHN R. GAMMETER.